US005623030A

United States Patent [19]
Tsumura et al.

[11] Patent Number: 5,623,030
[45] Date of Patent: Apr. 22, 1997

[54] CURABLE COMPOSITION AND PROCESS FOR PRODUCING MOLDED ARTICLES USING THE SAME

[75] Inventors: Manabu Tsumura; Masafumi Hiraishi; Takahisa Iwahara; Toshifumi Hirose, all of Hyogo, Japan

[73] Assignee: Kanegafuchi Kagaku Kogyo Kabushiki Kaisha, Osaka, Japan

[21] Appl. No.: 564,593

[22] Filed: Nov. 29, 1995

[30] Foreign Application Priority Data

Dec. 1, 1994 [JP] Japan .................................. 6-321193

[51] Int. Cl.⁶ ................................................ C08F 283/00
[52] U.S. Cl. ........................ 525/478; 525/479; 528/15; 528/16; 528/17; 528/18; 528/19; 264/331.11
[58] Field of Search ............................. 528/15, 17, 18, 528/19, 16; 525/478, 479; 264/331.11

[56] References Cited

U.S. PATENT DOCUMENTS 5,178,947  1/1993  Charmot et al. .................... 523/212
5,484,867  1/1996  Lichtenhan et al. ................ 528/40

*Primary Examiner*—Melvyn I. Marquis
*Attorney, Agent, or Firm*—Armstrong, Westerman, Hattori, McLeland & Naughton

[57] ABSTRACT

A curable composition providing a cured product having a silicon type interpenetrating polymer network, which comprises (A) a silsesquioxane ladder polymer, (B) a silicon compound having at least two SiH groups per molecule, (C) a silicon compound having at least two vinylsilyl groups per molecule and (D) a neutral platinum catalyst; and a process for producing a molded article comprising heating the curable composition under a controlled temperature for synchronously causing hydrolysis and condensation of the alkoxysilyl group and/or silanol group and hydrosilylation.

17 Claims, No Drawings

CURABLE COMPOSITION AND PROCESS FOR PRODUCING MOLDED ARTICLES USING THE SAME

FIELD OF THE INVENTION

This invention relates to a curable composition and a process for producing a molded article using the same. More particularly it relates to a curable composition comprising a curing system comprised mainly of a silsesquioxane ladder polymer and capable of curing through hydrolysis and condensation of an alkoxysilyl group and/or condensation of a silanol group and a curing system which is capable of curing through hydrosilylation (addition reaction) and comprised of a silicon compound containing at least two SiH groups and/or vinyl groups per molecule and having a number average molecular weight of not more than 1,000 and a catalyst for hydrosilylation, which composition is considered to provide a cured product having a novel silicon type interpenetrating polymer network (hereinafter referred to as IPN); and a process for producing thick-walled articles using the curable composition.

BACKGROUND OF THE INVENTION

JP-A-6-256518 (the term "JP-A" as used herein means an "unexamined published Japanese patent application")(corresponding to U.S. Pat. No. 5,449,734) discloses a curable composition which undergoes condensation reaction and addition reaction in one pot to provide a cured product having a silicon type IPN composed of a network silicon skeleton and a silicon-containing polymer, e.g., polycarbosilane or polysiloxane.

However, the publication shows no guideline for securing the compatibility between a system curing on condensation and a system curing on addition, which seems to be an important prerequisite for IPN formation, and homogeneity of a cured product obtained after curing. Neither does it teach a process for producing a thick-walled molded article having practical mechanical characteristics sufficient for use as heat-resistant structural material.

SUMMARY OF THE INVENTION

An object of the present invention is to provide a curable composition comprising a system curing on condensation (hereinafter referred to as a condensation curing system) and a system curing on addition reaction (hereinafter referred to as an addition curing system) with good compatibility to each other and providing a thick-walled article having excellent mechanical characteristics.

Another object of the present invention is to provide a process for producing a thick-walled molded article which seems to have a novel silicon type IPN and exhibits excellent mechanical characteristics from a curable composition.

The above objects of the present invention are accomplished by composing a curable composition from a condensation curing system which is comprised mainly of a silsesquioxane ladder polymer and an addition curing system (capable of curing through hydrosilylation) which is comprised of silicon compounds having a number average molecular weight of not more than 1,000 and a hydrosilylation catalyst.

As a result of extensive study on the above-mentioned subject matter, the inventors have found that the curing components used in the present invention, i.e., a condensation curing system and an addition curing system, are uniformly compatible with each other before curing over a broad composition ratio, that the composition secures uniformity even after curing, and that a thick-walled cured article free from noticeable cracks can be obtained from the composition by gradually diffusing or volatilizing the organic solvent used and condensation products produced by the condensation reaction. The present invention has been reached based on these findings.

The present invention provides a curable composition comprises:

(A) a silsesquioxane ladder polymer represented by formula (I):

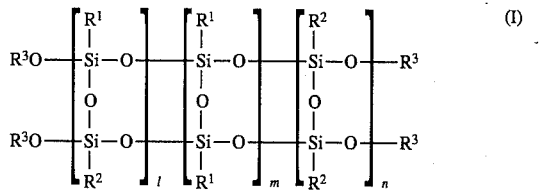

wherein a plurality of $R^1$, which may be the same or different, each represent a monovalent hydrocarbon group; a plurality of $R^2$, which may be the same or different, each represent a monovalent aromatic hydrocarbon group; $R^3$ represents a hydrogen atom or a monovalent hydrocarbon group; $l$, $m$, and $n$ each represent 0 or a positive integer satisfying $2 \leq l+m+n$, and having a number average molecular weight of not less than 500, (B) a silicon compound having at least two SiH groups per molecule and having a number average molecular weight of not more than 1,000, (C) a silicon compound having at least two vinylsilyl groups per molecule and having a number average molecule weight of not more than 1,000, and (D) a neutral platinum catalyst.

The present invention also relates to a process for producing a molded article, which comprises maintaining the above-mentioned curable composition, as uniformly dissolved or dispersed in 20 to 200 parts by volume of an organic solvent per 100 parts by weight of the silsesquioxane ladder polymer represented by formula (I), at a temperature lower than the boiling point of the organic solvent for 8 hours or more, and then increasing the temperature within a range of from 20° to 400° C., preferably from 20° to 250° C., intermittently or continuously thereby to cause hydrolysis and condensation of the alkoxysilyl group and/or silanol group and hydrosilylation (addition reaction) to proceed synchronously.

DETAILED DESCRIPTION OF THE INVENTION

Component (A) which can be used in the present invention is a component which cures through hydrolysis and condensation. The silsesquioxane ladder polymer as component (A) (hereafter sometimes referred to as silsesquioxane ladder polymer (A)) has a structure represented by formula (I) and a number average molecular weight of not less than 500. Taking into consideration the compatibility with other components constituting the curable composition, and the solubility and reactivity of component (A) itself, the number average molecular weight of component (A) is preferably 500 to 10,000, more preferably 500 to 5,000, most preferably 500 to 1,500.

In formula (I), $R^1$ represents a monovalent hydrocarbon group, preferably a methyl group. The plural $R^1$ groups may be the same or different. $R^2$ represents a monovalent aromatic hydrocarbon group, preferably a phenyl group. The plural $R^2$ groups may be the same or different. $R^3$ represents a hydrogen atom or a monovalent hydrocarbon group, preferably a hydrogen atom, a methyl group or an ethyl group. l, m, and n each represent 0 or a positive integer satisfying $2 \leq l+m+n$, preferably satisfying $2 \leq l+m+n \leq 12$.

Each of R and $R^2$ in l × the repeating unit on the left hand side of formula (I) (hereinafter referred to as l units) may be the same or varied among the l units. Such also applies to $R^1$ in m × the repeating unit in the middle of formula (I) (hereinafter referred to as m units) and $R^2$ in n × the repeating unit on the right hand side of formula (I) (hereinafter referred to as n units). The n units, m units, and l units may be in a respective block or these units may be mixed up at random.

Components (B), (C), and (D) serve for curing through hydrosilylation (addition). The silicon compound as component (B) is not particularly limited as long as it contains at least two SiH groups per molecule and has a number average molecular weight of not more than 1,000. Suitable examples of component (B) include hydrosilanes represented by formulae (II) to (VII) shown below and hydrosilanes composed of an aromatic ring with its three or more hydrogen atoms substituted with $SiR_2H$, $SiRH_2$ or $SiH_3$ (wherein R represents a monovalent organic group having 1 to 20 carbon atoms).

$$HSiR_2\text{-}X\text{-}SiR_2H \quad (II)$$

$$HSiR_2H \quad (III)$$

$$H_aSiR_{(4-a)} \quad (IV)$$

$$H_{(a-1)}SiR_{(4-a)}\text{-}(X)_m(SiRH)_nSiR_{(4-a)}H_{(a-1)} \quad (V)$$

$$R'\text{-}(X)_m(SiRH)_{(n+2)}\text{-}R' \quad (VI)$$

$$[X\text{-}SiR_{(4-a)}H_{(a-2)}]_{(n+2)} \quad (VII)$$

(In the formulae (II) to (VII), wherein R represents a monovalent organic group having 1 to 20 carbon atoms; R' represents a hydrogen atom or a monovalent organic group; X represents a divalent group; a represents 3 or 4; n represents 0 or an integer of 1 to 30; and m represents an integer of 1 to 31.)

These silicon compounds may be used either individually or as a combination of two or more thereof. The organic group having 1 to 20 carbon atoms as represented by R in formulae (II) to (VII) includes methyl, ethyl, n-propyl, isopropyl, n-butyl, t-butyl, isoamyl, n-octyl, n-nonyl, phenyl, and trimethylsiloxy groups, with methyl and phenyl groups being preferred. The divalent group as represented by X in formulae (II) and (V) to (VII) includes the following groups:

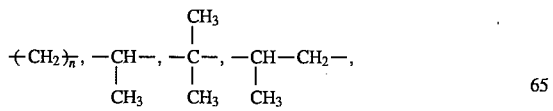

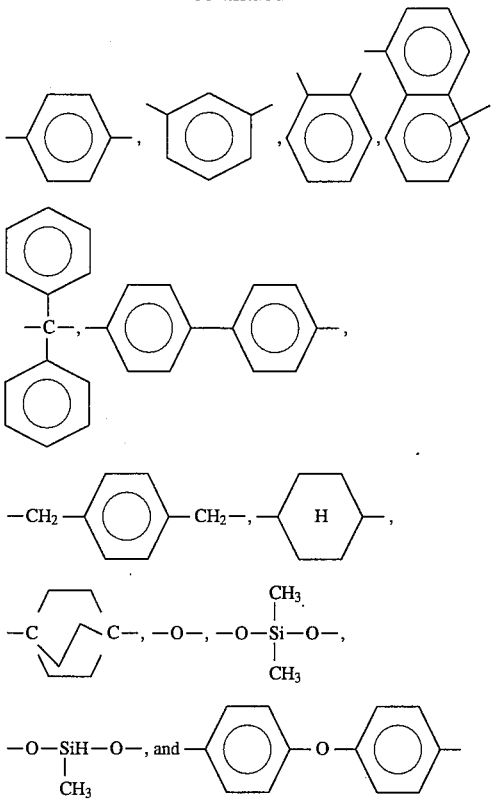

wherein n is an integer of 1 to 4.
Preferred of these groups are:

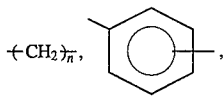

—O—, and —OSiMe$_2$O—
wherin n is an integer of 1 to 4; and Me represents a methyl group (hereinafter the same).
Still preferred of them are:

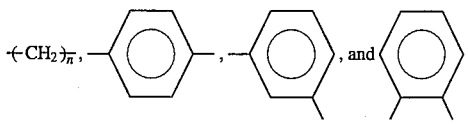

wherein n is as defined above.

The monovalent organic group as represented by R' in formula (VI) includes hydrogen atom, methyl, ethyl, phenyl and trimethylsiloxy groups. R' preferably represents a hydrogen atom.

Examples of component (B) which can preferably be used are shown blow.

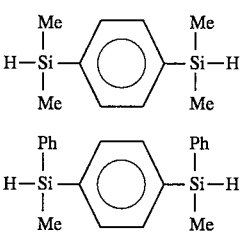

-continued

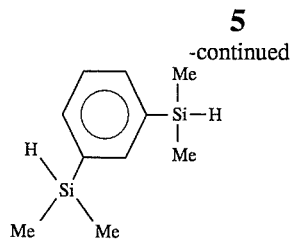

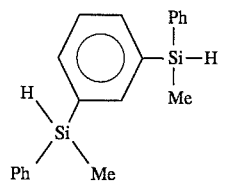

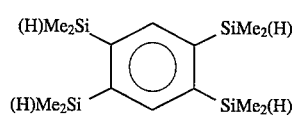

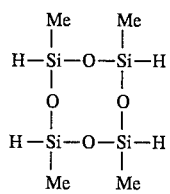

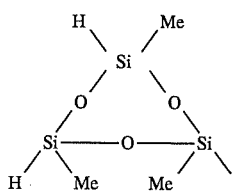

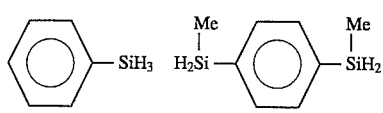

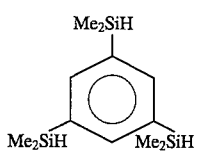

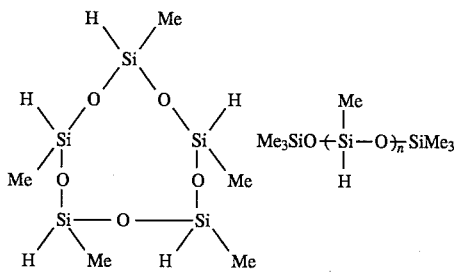

wherein Me is as defined above; Ph represents a phenyl group (hereinafter the same); and n represents an integer of 3 to 5.

The silicon compound as component (C) is not particularly limited as long as it contains at least two vinylsilyl groups per molecule and has a number average molecular weight of not more than 1,000. Suitable examples of component (C) include vinylsilanes represented by formulae (VIII) to (XIII) shown below and vinylsilanes composed of an aromatic ring with its three or more hydrogen atoms substituted with $SiR_2(CH=CH_2)$, $SiR(CH=CH_2)_2$ or $Si(CH=CH_2)_3$ (wherein R represents a monovalent organic group having 1 to 20 carbon atoms).

$$CH_2=CR'-SiR_2-X-SiR_2-CR'=CH_2 \qquad (VIII)$$

$$CH_2=CR'-SiR_2-CR'=CH_2 \qquad (IX)$$

$$(CH_2=CH)_a SiR_{(4-a)} \qquad (X)$$

$$(CH_2=CH)_{(a-2)}SiR_{(4-a)}-(X)_m-SiR_{(4-a)}(CH=CH_2)_{(a-1)} \qquad (XI)$$

$$R'-(X)_m[SiR(CH=CH_2)]_{(n+2)}-R' \qquad (XII)$$

$$[X-SiR_{(a-4)}(CH=CH_2)_{(a-2)}]_{(n+2)} \qquad (XIII)$$

(In the formulae (VIII) to (XIII), R, X, and R' are as defined above for those of formulae (II) to (VII) (preferred structures are also the same); m represents an integer of 1 to 31; and n represents 0 or an integer of 1 to 30.) These silicon compounds may be used either individually or as a combination of two or more thereof. Examples of component (C) which can preferably be used are shown blow.

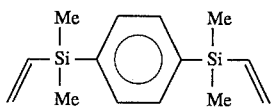

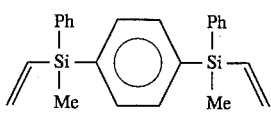

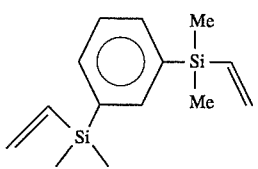

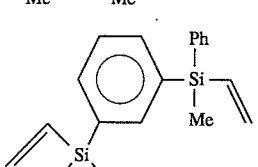

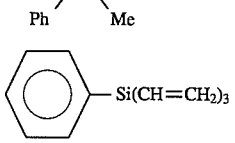

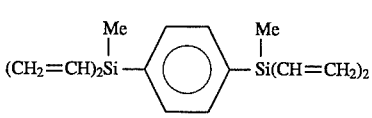

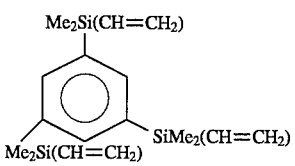

$Si(CH=CH_2)_4$

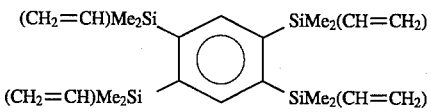

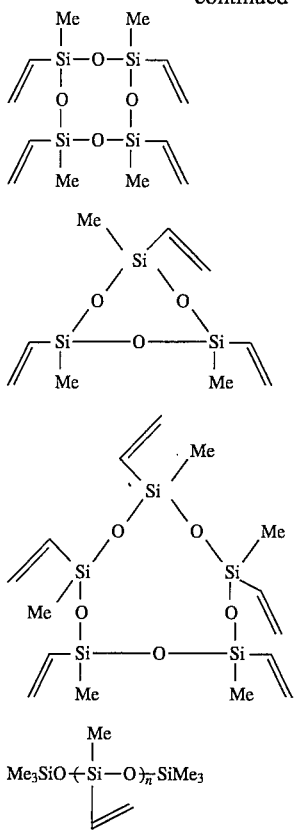

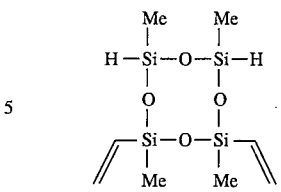

wherein Me and Ph are as defined above; and n represents an integer of 3 to 5.

In addition to components (B) and (C) an organosilicon compound containing at least one SiH group and at least one vinylsilyl group per molecule and having a number average molecular weight of not more than 1,000 can also be used as a component of addition curing system in accordance with the end use. Examples of such compounds are shown below:

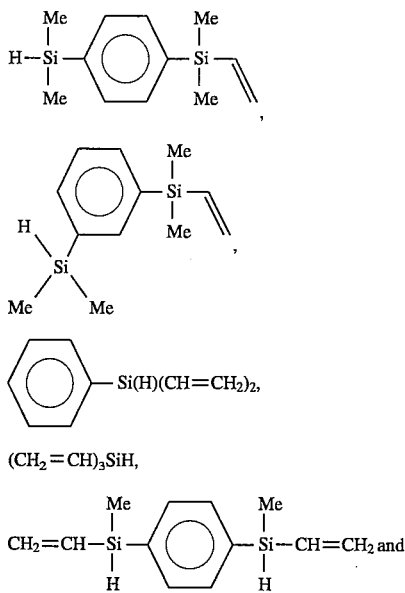

Components (B) and (C) have a number average molecular weight of not more than 1,000, preferably not more than 500.

In the curable composition, a ratio of total SiH groups to total vinylsilyl groups in all the compounds participating in the addition reaction is preferably 0.5 to 5, more preferably 0.6 to 3, and most preferably 0.8 to 2.

The neutral platinum catalyst as component (D) serves as catalyst for hydrosilylation, by which a hydrosilylation reaction, and hydrolysis and condensation reactions of an alkoxysilane proceed in one pot in good yield without being accompanied by production of unfavorable by-products. Such neutral platinum catalysts include platinum-organic compound complexes, platinum-organic functional siloxane complexes, and platinum-diolefin compound complexes. In particular, a platinum-vinylsiloxane complex, a platinum-acetylacetonato complex, and a platinum-decadiene complex are preferred. A recommended, while not limiting, amount of component (D) to be used is $10^{-1}$ to $10^{-8}$ mol, particularly $10^{-3}$ to $10^{-6}$ mol, per mole of SiH groups.

In some cases, the neutral platinum catalyst may be used in combination with a cure retarder to control the reaction rate of hydrosilylation thereby making it possible to synchronously achieve hydrosilylation reaction and alkoxysilane hydrolysis and condensation reactions. Useful cure retarders include compounds having an aliphatic unsaturated bond, organophosphorus compounds, organosulfur compounds, nitrogen-containing compounds, tin compounds, and organic peroxides. Examples of the compounds having an aliphatic unsaturated bond include propargyl alcohol, ene-yne compounds, and maleic esters such as dimethyl maleate. Examples of the organophosphorus compounds are triorganophosphines, diorganophosphines, organophosphones, and triorganophosphites. The organosulfur compounds include organomercaptanes, diorganosulfides, hydrogen sulfide, benzothiazole, and benzothiazole disulfite. The nitrogen-containing compounds include ammonia, primary, secondary or tertiary alkylamines, arylamines, urea, and hydrazine. The organic peroxides include di-t-butyl peroxide, dicumyl peroxide, benzoyl peroxide, and t-butyl perbenzoate.

In addition to the essential components (A) to (D), the curable composition of the present invention may further contain (E) a catalyst for silanol condensation, (F) a polyfunctional crosslinking agent capable of silanol condensation, (G) water, and (H) a silica type crosslinking agent.

Component (E) serves to accelerate hydrolysis and condensation of the terminal functional groups $SiOR^3$ of silsesquioxane ladder polymer (A). Where the curable composition contains components (F) and (G) or component (H), component (E) also functions to accelerate the condensation of the alkoxy groups or silanol groups present in compounds (F) or (H) or silanol groups produced by hydrolysis or to accelerate the condensation between these functional groups and the terminal functional groups $SiOR^3$ of silsesquioxane ladder polymer (oligomer) (A).

The catalyst for silanol condensation as component (E) is selected from a broad range of known catalysts, such as various acid catalysts, alkali catalysts and organometallic compounds. Specific but non-limiting examples of suitable catalysts (E) are as follows. Suitable acid catalysts include hydrochloric acid, sulfuric acid, nitric acid, acetic acid, phosphoric acid, phosphoric esters, active clay, iron chloride, boric acid, trifluoroacetic acid, trifluoromethanesulfonic acid, and p-toluenesulfonic acid. Suitable alkali catalysts are hydroxides of alkali metals or alkaline earth metals, alkoxides of alkali metals or alkaline earth metals, tetraalkylammonium hydroxides, tetraalkylphosphonium hydroxides, and amine compounds. Specific examples of the amine compounds include pyridine, picoline, lutidine, pyrazine, piperidone, piperidine, piperazine, pyrazole, pyridazine, pyrimidine, pyrrolidine, butylamine, octylamine, laurylamine, dibutylamine, monoethanolamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5,4,0]undecene (DBU), carboxylic acid salts of these amine compounds, low-molecular weight polyamide resins obtained from an excess polyamine and a polybasic acid, the reaction product between an excess polyamine and an epoxy compound, and amino-containing silane coupling agents, such as γ-aminopropyltrimethoxysilane and N-(β-aminoethyl)aminopropylmethyldimethoxysilane. Fluorine compounds, such as tetrabutylammonium fluoride, potassium fluoride and sodium fluoride, are also useful.

The organometallic compounds as component (E) include organic acid salts, alkoxides and chelates of tin, lead, zinc, iron, cobalt, titanium, aluminum, zirconium, boron, etc.

Examples of suitable organotin catalysts include those represented by formula (XIV):

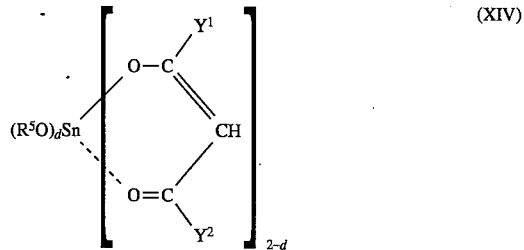

wherein $R^5$ represents a substituted or unsubstituted monovalent hydrocarbon group, such as an alkyl group, a substituted alkyl group (e.g., chloromethyl), an alkenyl group (e.g., vinyl or allyl) or an aryl group (e.g., phenyl or tolyl); $Y^1$ and $Y^2$ each represent an alkyl or alkoxy group having 1 to 8 carbon atoms; and d represents 0, 1 or 2, and those represented by formula (XV):

wherein $R^6$ represents a substituted or unsubstituted monovalent hydrocarbon group, such as an alkyl group, a substituted alkyl group (e.g., chloromethyl), an alkenyl group (e.g., vinyl or allyl) or an aryl group (e.g., phenyl or tolyl).

Specific examples of these organotin compounds are tin (II) methoxide, tin (II) ethoxide, tin (II) 2,4-pentanedionate, tin (II) octanoate, tin (II) acetate, dibutyltin dilaurate, dibutyltin maleate, dibutyltin diacetate, tin naphthenate, a reaction product between dibutyltin oxide and a phthalic ester, and dibutyltin diacetylacetonate.

The organolead catalysts include those represented by formula (XVI):

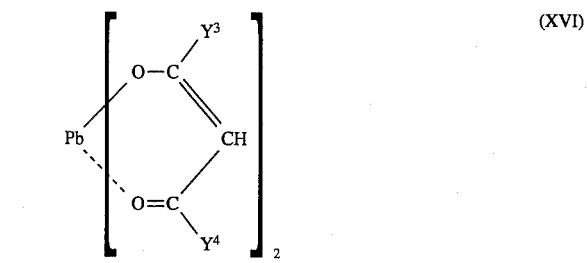

wherein $Y^3$ and $Y^4$ each represent a substituted or unsubstituted alkyl or alkoxy group having 1 to 8 carbon atoms.

Specific examples of the compounds of formula (XVI) are lead (II) hexafluoropentanedionate, lead (II) 2,4-penatanedionate, lead (II) 2,2,6,6-tetramethyl-3,5-heptanedionate, and lead octylate.

The organozinc catalysts include those represented by formula (XVII):

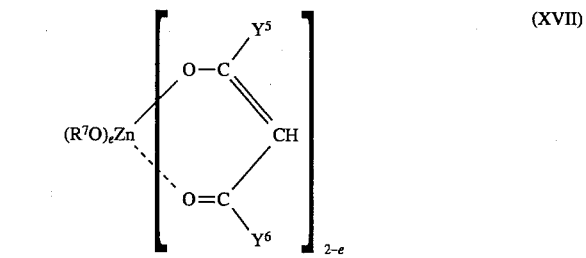

wherein $R^7$ represents a substituted or unsubstituted monovalent hydrocarbon group, such as an alkyl group, a substituted alkyl group (e.g., chloromethyl), an alkenyl group (e.g., vinyl or allyl) or an aryl group (e.g., phenyl or tolyl); $Y^5$ and $Y^6$ each represent an alkyl or alkoxy group having 1 to 8 carbon atoms; and e represents 0, 1 or 2, and those represented by formula (XVIII):

wherein $R^8$ represents a substituted or unsubstituted monovalent hydrocarbon group, such as an alkyl group, a substituted alkyl group (e.g., chloromethyl), an alkenyl group (e.g., vinyl or allyl) or an aryl group (e.g., phenyl or tolyl).

Specific examples of these organozinc compounds are zinc dimethoxide, zinc diethoxide, zinc methoxyethoxide, zinc 2,4-pentanedionate, zinc acetate, zinc 2-ethylhexanoate, zinc formate, zinc methacrylate, zinc neodecanoate, zinc undecylenate, and zinc octylate.

The organoiron catalysts include thos represented by formula (XIX):

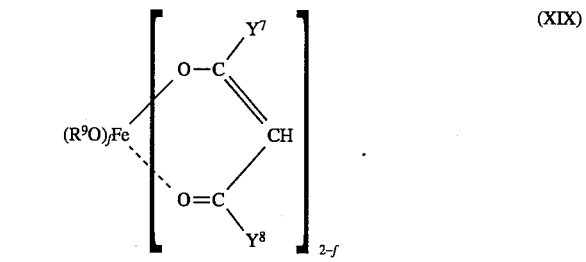

wherein $R^9$ represents a substituted or unsubstituted monovalent hydrocarbon group, such as an alkyl group, a substituted alkyl group (e.g., chloromethyl), an alkenyl group (e.g., vinyl or allyl) or an aryl group (e.g., phenyl or tolyl); $Y^7$ and $Y^8$ each represent a substituted or unsubstituted alkyl or alkoxy group having 1 to 8 carbon atoms; and f represents 0, 1, 2 or 3.

Specific examples of the compounds of formula (XIX) are iron (III) benzoylacetonate, iron (III) ethoxide, iron (III) 2,4-pentanedionate, iron (III) trifluoropentanedionate, and iron octylate.

The organocobalt catalysts include those represented by formula (XX):

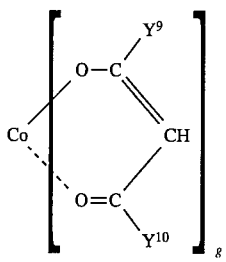
(XX)

wherein $Y^9$ and $Y^{10}$ each represent a substituted or unsubstituted alkyl or alkoxy group having 1 to 8 carbon atoms; and g represents 2 or 3.

Specific examples of the compounds of formula (XX) are cobalt (II) 2,4-pentanedionate and cobalt (III) 2,4-pentanedionate.

The organotitanium catalysts include tetraalkyl orthotitanates and titanium chelates. The tetraalkyl orthotitanates include those represented by formula (XXI):

(XXI)

wherein $R^{10}$ represents a substituted or unsubstituted monovalent hydrocarbon group, preferably a hydrocarbon group having 1 to 4 carbon atoms, such as methyl, ethyl, n-propyl, isopropyl or n-butyl.

The titanium chelates include those represented by formula (XXII):

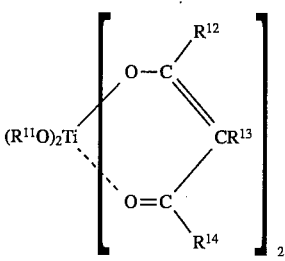
(XXII)

wherein $R^{11}$, $R^{12}$, and $R^{14}$ each represent a monovalent hydrocarbon group; and $R^{13}$ represents a hydrogen atom or a monovalent hydrocarbon group.

Specific examples of the titanium chelates of formula (XXII) are diisopropoxybis(ethyl acetoacetato)titanium, diisopropoxybis(methyl acetoacetato)titanium, diisopropoxybis(acetylacetone)titanium, and dibutoxybis(ethyl acetoacetato)titanium.

The aluminum alkoxide catalysts include those represented by formula (XXIII):

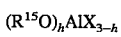
(XXIII)

wherein $R^{15}$ represents a substituted or unsubstituted alkyl group; X represents a monovalent negative group except an alkoxy group; and h represents 0, 1, 2 or 3. The most preferred aluminum alkoxides are aluminum trialkoxides of formula (XXIII) in which h is 3. Aluminum alkoxides with part of its alkoxy groups displaced with X, etc. are also useful. The negative group as X preferably includes a halogen atom (e.g., F⁻, Cl⁻ or Br⁻) and a group represented by formula (XXIV):

(XXIV)

wherein $Y^{11}$ and $Y^{12}$ each represent an alkyl or alkoxy group having 1 to 8 carbon atoms.

Specific examples of the aluminum alkoxide catalysts are aluminum triisopropoxide, aluminum tri(sec-butoxide), aluminum diisopropoxy-sec-butoxide, diisopropoxyacetylacetonatoaluminum, sec-butoxyacetylacetonatoaluminum, aluminum diisopropoxide ethyl acetoacetate, and aluminum di-sec-butoxide ethyl acetoacetate.

The zirconium alkoxides or chelates as catalyst (E) include those represented by formula (XXV):

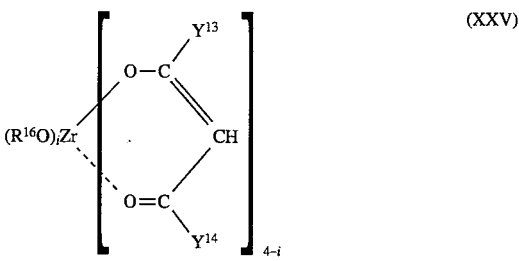
(XXV)

wherein $R^{16}$ represents a substituted or unsubstituted monovalent hydrocarbon group, such as an alkyl group, a substituted alkyl group (e.g., chloromethyl), an alkenyl group (e.g., vinyl or allyl) or an aryl group (e.g., phenyl or tolyl); $Y^{13}$ and $Y^{14}$ each represent an alkyl or alkoxy group having 1 to 8 carbon atoms; and i represents 0, 1, 2, 3 or 4.

Specific examples of these organozirconium compounds are zirconium tetrabutoxide, zirconium tetraisopropoxide, zirconium tetramethoxide, tributoxyacetylacetonatozirconium, bisbutoxyacetylacetonatozirconium, butoxytris(acetylacetonato)zirconium, tributoxy(ethyl acetylacetato)zirconium, dibutoxybis(ethyl acetoacetato)zirconium, butoxytris(ethyl acetoacetato)zirconium, tetrakisacetylacetonatozirconium, and tetrakis(ethyl acetoacetato)zirconium.

The boron alkoxide catalysts include those represented by formula (XXVI):

(XXVI)

wherein $R^{17}$ represents a substituted or unsubstituted monovalent hydrocarbon group, such as an alkyl group, a substituted alkyl group (e.g., chloromethyl), an alkenyl group (e.g., vinyl or allyl) or an aryl group (e.g., phenyl or tolyl). Examples of these compounds are boron methoxide, boron ethoxide, and boron n-butoxide.

These catalysts as component (E) may be used either individually or, if acceptable, as a combination of two or more thereof. Preferred of these catalysts are neutral organometallic compounds, with organotitanium catalysts and organoaluminum catalysts being still preferred. Especially preferred are organotitanium catalysts, such as Ti(O-iPr)$_2$(acac)$_2$, Ti(O-nBu)$_4$, Ti(OMe)$_4$, and Ti(O-iPr)$_4$, wherein iPr is an isopropoxy group; acac is an acetoacetato ligand; and nBu is an n-butyl group (hereinafter the same).

Component (E) is used in an amount of 0.01 to 20 parts by weight, preferably 0.3 to 10 parts by weight, more preferably 0.5 to 6 parts by weight, per 100 parts by weight of silsesquioxane ladder polymer (A).

The polyfunctional silicon compound capable of silanol condensation as component (F) preferably includes those represented by formula (XXVII):

wherein $R^4$ represents a monovalent organic group; and k represents a positive integer satisfying $1 \leq k \leq 7$. Specific examples of the silicon compound of formula (XXVII) are $Si(OEt)_4$, $MeSi(OMe)_3$, $Si(OAc)_4$, $MeO\{Si(OMe)_2O\}_nMe$ (n=3 to 6 in average), and $EtO\{Si(OEt)_2O\}_nEt$ (n=3 to 6 in average), wherein Et is an ethyl group; and Ac is an acetyl group (hereinafter the same). Additional examples of useful polyfunctional silicon compounds include $MeSi(OMe)_3$, $MeSi(OEt)_3$, $MeSi(OAc)_3$, $Ph_2Si(OH)_2$, $PhMe_2SiOH$, $Ph_2MeSiOH$, $PhSi(OH)_3$ or a low-molecular weight oligomer thereof, $Me_3SiOH$, and $MeSi(OH)_3$ or a low-molecular weight oligomer thereof.

Component (F) is used in an amount of 5 to 50 parts by weight, preferably 10 to 50 parts by weight, per 100 parts by weight of silsesquioxane ladder polymer (A). If the amount of component (F) added is less than 5 parts by weight, the effect of addition is insubstantial. If it exceeds 50 parts, a cured product of the curable composition tends to be brittle.

Water as component (G) can be added in order to accelerate the hydrolysis of the alkoxysilyl groups present in the curable composition thereby to accelerate the condensation reaction sufficiently. Water is added in an amount of 10 to 100 mol % based on the total alkoxy group content in the curable composition. If the amount of water added exceeds 100 mol %, the curable composition tends to fail to provide a uniform cured product.

The silica type crosslinking agent which can be used as component (H) includes fine powder of silica hydrate or anhydrous silica or silica powder having been treated with various surface treating agents. The silanol group of the silica powder or water adsorbed on the silica powder participates in the condensation of the terminal functional groups $SiOR^3$ of silsesquioxane ladder polymer (A) thereby bringing about improvement in physical properties of the resulting cured product. Component (H) is preferably used in an amount of 5 to 30 parts by weight per 100 parts by weight of silsesquioxane ladder polymer (A).

The composition ratio of the condensation curing system (component (A)) and the addition curing system (components (B) to (D)) in the curable composition is subject to variation depending on the use of the curable composition and the cured product thereof. For example, where the cured product is intended for use as structural material demanded to have high elasticity and high strength, the condensation curing system/addition curing system ratio is preferably 1 or more, still preferably 2 or more, most preferably 3 or more, by weight. Where use as rubbery material is intended, the ratio is preferably not more than 1, still preferably not more than ½, particularly preferably not more than ⅓, by weight.

In the present invention, an organic solvent can be used for uniformly mixing the above-described components. It is desirable for the organic solvent to be capable of sufficiently dissolving silsesquioxane ladder polymer (A) and capable of dissolving water to some extent. Such organic solvents include hydrocarbons, such as benzene and toluene; ethers, such as tetrahydrofuran, 1,4-dioxane, and diethyl ether; ketones, such as acetone and methyl ethyl ketone; esters, such as ethyl acetate; and halogenated hydrocarbons, such as chloroform, methylene chloride, and 1,2-dichloroethane. These solvents may be used either individually or as a mixture of two or more thereof. Tetrahydrofuran and chloroform are preferred solvents.

The organic solvent is used in an amount of 20 to 200 ml, preferably 60 to 120 ml, per 100 g of silsesquioxane ladder polymer (A). If used in amounts less than 20 ml, it is difficult to solve silsesquioxane ladder polymer (A). If the amount exceeds 200 ml, a cured product free from air bubbles and cracks is hard to obtain.

The process for producing a molded article from the curable composition of the present invention will be described below. A molded article free from noticeable cracks can be produced from the curable composition of the present invention by heating the composition to cure while controlling the rate of temperature increase so as to realize a good balance of a rate of condensation curing, a rate of volatilization of the volatile matter from the curing system, and a rate of diffusion of the volatile matter remaining in the system. In carrying out curing, the curable composition is first maintained at a temperature lower than the boiling point of the organic solvent used, e.g., about 20° to 50° C., for at least 8 hours and then the temperature is increased within a range of from 20° to 400° C., preferably 20° to 250° C., either intermittently or continuously. A thick-walled article can be obtained by, for example, casting the curable composition into a mold, the inner wall of which has thereon a polyimide film via a double-sided adhesive tape, placing the mold with a cap on horizontally in a hot air drier, and gradually elevating the temperature to cause cure. The polyimide film adhered to the inner wall of the mold provides easy release for a composition being cured so that a cured product may easily release from the mold even if it shrinks and thereby be prevented from initiating cracks. Heat cure is conducted by increasing the temperature within a range of from 20° to 400° C. either intermittently or continuously. In the case of continuously increasing temperature, gradual increase at a rate of not more than 5° C./hr is preferred. In the case of intermittent temperature increase, heating with successive, at 50° C. for 8 to 24 hours, at 80° C. for 8 to 24 hours, at 100° C. for 8 to 24 hours, and then at 150° C. for 12 to 70 hours may be mentioned as a preferred example of temperature increase.

If desired, a product after heat cure may further be subjected to heat treatment in order to meet the requirement of improvement in physical properties or the end use. The heat treatment can be carried out at 150° to 450° C. in air or an inert gas, such as nitrogen or argon, or under reduced pressure.

The present invention will now be illustrated in greater detail by way of Examples, but it should be understood that the present invention is not deemed to be limited thereto. Unless otherwise indicated, all the percents and parts are given by weight.

In Examples, the following commercially available products were used.

1) Silsesquioxane ladder polymer (A):

"Glass Resin (GR)" series produced by Owens Illinois Incorporated and purchased from Showa Denko K. K. were used.

1-1) GR-100 (Ph/Me on silicon: 1/2; weight average molecular weight (Mw)/number average molecular weight (Mn): 7210/1260 on polystyrene standard conversion by gel-permeation chromatography (GPC) (hereinafter the same))

1-2) GR-950 (Ph/Me on silicon: 1/0; Mw/Mn: 1080/690)

1-3) 3/1 (by weight) mixture (GR-150*; Ph/Me on silicon: 1/1) of GR-100 and GR-908 (Ph/Me on silicon: 4/1; Mw/Mn: 1270/680)

2) Polyfunctional crosslinking agent (F):

"Methyl Silicate 51", a compound of formula (XXVII) wherein $R^4$=Me and k=4 (average), produced by Colcoat Company Ltd.

3) Silica type crosslinking agent:

Silica hydrate "NIPSIL-LP" produced by Nippon Silica Kogyo K. K.

EXAMPLE 1

In a 50 ml tube were put 5.0 g of GR-150* and 2.5 g of Methyl Silicate 51. To the mixture was added 5 cc of tetrahydrofuran (THF) as a solvent, and Glass Resin was completely dissolved by means of an ultrasonic cleaning system. A condensation catalyst $Ti(O-iPr)_2(acac)_2$ (500 mg) was added to the solution. In a separate 10 ml tube were put 918 mg (3.5 mmol) of 1,4-bis(dimethylvinylsilyl)benzene, 449 mg (2.3 mmol) of 1,4-bis(dimethylsilyl)benzene, and 211 mg (0.88 mmol) of 1,3,5,7-tetramethylcyclotetrasiloxane, and 30 mg of a 10% THF solution of dimethyl maleate (cure retarder) was added thereto, followed by shaking lightly to mix (300 equivalents to a platinum catalyst hereinafter described). The carbosilane solution and the above prepared silsesquioxane ladder polymer solution were mixed together, and 7.2 mg of a Pt-vinylsiloxane complex (synthesized from $H_2PtCl_6 \cdot 6H_2O/[Me_2(CH_2=CH)Si]_2O/NaHCO_3$/toluene; $9.71 \times 10^{-6}$ mmol/mg; $1 \times 10^{-6}$ equivalent to the Si-vinyl group).

A 25 μm thick polyimide film was laid on the inner wall of an ointment can of 6.7 cm in diameter via a double-sided adhesive tape, and the above prepared mixed solution was slowly cast in the can. The can was placed horizontally in a hot air drier, the cap was fitted on, and the can and the contents were heated at 50° C. for 18 hours, at 80° C. for 9 hours, at 100° C. for 14 hours, and then at 150° C. for 22 hours for curing. The resulting cured product was a 2.3 mm thick clear brown solid. A test specimen of about 40 mm in length and about 5 mm in width was cut out of the solid with a diamond cutter.

The amounts of condensation curing system components and the addition curing system components used in the curing composition are shown in Tables 1 and 2 shown below, respectively.

EXAMPLES 2 TO 17

A curable composition was prepared in the same manner as in Example 1 except for the alterations shown in Tables 1 and 2 below. A cured product was prepared and a test specimen was cut out therefrom in the same manner as in Example 1, provided that in Examples in which the Ti catalyst was not used, cure was conducted by heating at 50° C. for 18 hours, at 80° C. for 9 hours, at 100° C. for 40 hours, and then at 150° C. for 72 hours.

The cured products and test specimens prepared in Examples 1 to 17 were evaluated in terms of flexural characteristics, thermogravimetric loss, and oxygen index in accordance with the following test methods.

1) Flexural Characteristics:

Flexural modulus, flexural strength, and flexural elongation were measured by means of a precision universal tester produced by Shimadzu Corporation in accordance with JIS K7203 (flexural test method using small specimens; span: 15 mm; indenter: 5R; support: 2R; test speed: 0.5 mm/min).

2) Thermogravimetric Loss:

A small piece of about 10 mg was precisely weighed out of the cured product and thermogravimetrically analyzed by means of TGA-50 manufactured by Shimadzu Corp. The piece was heated in a nitrogen stream (30 ml/min) at a rate of 20° C./min, and the temperature at 5% weight loss ($Td_5$) was measured.

3) Limiting Oxygen Index (LOI):

Limiting oxygen index was determined using Suga Tester Model ON-1 in accordance with JIS 7201. Because the test specimen was small, wire was coiled around the lower part of the specimen, and the specimen was fixed about 10 cm down the upper part of the combustion cylinder.

The oxygen and nitrogen flow rates were adjusted with valves, and a gas stream having a prescribed oxygen concentration was made to flow from the bottom for at least 30 seconds. The upper part of the specimen was ignited with an ignition source, and the condition of combustion was observed. When the upper part of a specimen turned red but went out within 3 minutes (mostly within 20 seconds), the LOI was judged to be higher than the oxygen concentration of the gas, while the LOI of a specimen which continued burning more than 3 minutes was judged to be lower than the oxygen concentration. The higher the LOI, the higher the flame retardancy.

The results of the evaluation are shown in Table 3 below. The amounts of condensation curing system components and the addition curing system components used in the curing composition are shown in Tables 1 and 2 below, respectively.

TABLE 1

Condensation Curing System of Curing Composition

| Example No. | Ph/Me Ratio in (A) | Catalyst (E) (part) | Methyl Silicate (F) (part) | $H_2O$ (G) (part) | Silica* (H) (part) |
|---|---|---|---|---|---|
| 1 | 1/1 | 10 | 50 | — | — |
| 2 | 1/1 | 10 | 30 | — | — |
| 3 | 1/2 | 3 | — | — | — |
| 4 | 1/2 | 3 | 30 | 2 | — |
| 5 | 1/2 | 3 | 30 | — | — |
| 6 | 1/2 | 3 | 30 | 6 | — |
| 7 | 1/2 | — | 30 | — | — |
| 8 | 1/2 | — | — | — | 10 |
| 9 | 1/2 | 3 | — | — | 10 |
| 10 | 1/2 | — | 30 | — | 10 |
| 11 | 1/2 | — | — | 4 | 10 |
| 12 | 1/2 | — | 30 | 4 | — |
| 13 | 1/2 | 3 | 30 | — | 10 |
| 14 | 1/2 | 3 | — | 4 | 10 |
| 15 | 1/2 | — | 30 | 4 | 10 |
| 16 | 1/2 | 3 | — | 4 | — |
| 17 | 1/2 | 3 | — | 4 | — |

Note: *NIPSIL-LP (produced by Nippon Silica Kogyo K.K.)

TABLE 2

Addition Curing System of Curing Composition

| Example No. | SiH Component[1] (B) | Si-vinyl Component[2] (C) | SiH/Si-vinyl Molar Ratio | Dimethyl Maleate Equiv.[3] |
|---|---|---|---|---|
| 1 | a + b | c | 1.16 | 300 |
| 2 | b | c | 1.14 | 30 |
| 3 | b | d | 1.17 | 30 |
| 4 | b | d | 1.17 | 30 |
| 5 | b | c | 1.17 | 100 |
| 6 | b | c | 1.17 | 100 |

TABLE 2-continued

| | Addition Curing System of Curing Composition | | | |
|---|---|---|---|---|
| Example No. | SiH Component[1] (B) | Si-vinyl Component[2] (C) | SiH/Si-vinyl Molar Ratio | Dimethyl Maleate Equiv.[3] |
| 7 | b | c | 1.00 | 100 |
| 8 | b | c | 1.00 | 100 |
| 9 | b | c | 1.00 | 100 |
| 10 | b | c | 1.00 | 100 |
| 11 | b | c | 1.00 | 100 |
| 12 | b | c | 1.00 | 100 |
| 13 | b | c | 1.00 | 100 |
| 14 | b | c | 1.00 | 100 |
| 15 | b | c | 1.00 | 100 |
| 16 | b | c | 1.00 | 500 |
| 17 | b | c | 1.00 | 500 |

Note:
[1] SiH Component
a: 1,4-Bis(dimethylsilyl)benzene
b: 1,3,5,7-Tetramethylcyclotetrasiloxane
[2] Si-vinyl Component
c: 1,4-Bis(dimethylvinylsilyl)benzene
d: $[CH_3(CH_2\!=\!CH)SiO]_4$
[3] Equivalent to Pt-vinylsiloxane (used in an amount of $1 \times 10^{-5}$ equiv. to Si-vinyl group); dimethyl maleate was used as a cure retarder.

In 100 ml of dried toluene were dissolved 18.02 mg (1.03 mmol) of methylphenyldivinylsilane and 226 μl of a 1 wt % toluene solution of a platinum-vinylsiloxane complex ($1.88 \times 10^{-4}$ mmol; $1 \times 10^{-4}$ mmol per mmole of SiH group) (synthesized from $H_2PtCl_6 \cdot 6H_2O/[Me_2(CH_2\!=\!CH)Si]_2O/NaHCO_3$/toluene). To the Pt catalyst solution was slowly added dropwise 100 ml of a solution of 18.30 g (94 mmol) of 1,4-bis(dimethylsilyl)benzene in dried toluene at room temperature in a nitrogen atmosphere. After the addition, the reaction mixture was stirred at room temperature for one day while evaporating the volatile matter to obtain a crude polymer. The crude polymer was dissolved in hexane and subjected to column chromatography on silica gel to collect 9.68 g of reactive silicone polymer fraction 1 represented by formula: $CH_2\!=\!CH[Si(Ph)(Me) \cdot CH_2CH_2\text{-}SiMe_2\text{-}C_6H_4\text{-}p\text{-}SiMe_2\text{—}CH_2CH_2]Si(Ph)(Me)\text{—}CH\!=\!CH_2$ (Me is a methyl group and Ph is a phenyl group) as a hexane fraction and 12.60 g of fraction 2 as a toluene fraction. Fractions 1 and 2 had a molecular weight distribution Mw/Mn of 3400/1700 and 8700/5700, respectively, as measured by GPC and a vinyl content of 81.3 mmol/100 g and 29.6 mmol/100 g, respectively.

Reactive silicone polymer fraction 1 (500 mg), 4.9 μl of a platinum catalyst solution (synthesized from $H_2PtCl_6 \cdot 6H_2O/[Me_2(CH_2\!=\!CH)SiO]_4/NaHCO_3$/toluene;

TABLE 3

Physical Properties of Cured Product

| Example No. | Composition Ratio* | Gel Fraction (%) | Thickness (mm) | Appearance | Flexural Characteristics | | | TG Analysis | | | LOI |
|---|---|---|---|---|---|---|---|---|---|---|---|
| | | | | | Modulus (GPa) | Strength (MPa) | Elongation (%) | Weight Loss 400° C. | Weight Loss 500° C. | $Td_s$ (°C.) | |
| 1 | 8/2 | 97 | 2.0 | clear brown | 1.94 | 34.2 | 1.9 | 3.2 | 6.2 | 469 | — |
| 2 | " | 98 | 1.9 | " | 1.91 | 37.3 | 2.1 | 2.0 | 3.6 | 544 | 28 |
| 3 | " | 100 | 2.2 | " | 1.84 | 43.2 | 3.1 | 0.5 | 1.6 | >580 | — |
| 4 | " | 95 | 1.8 | clear yellow | 1.71 | 33.0 | 2.0 | 1.3 | 2.2 | >580 | — |
| 5 | " | 95 | 2.0 | " | 2.16 | 39.6 | 1.9 | 1.8 | 3.0 | 563 | — |
| 6 | " | 96 | 1.8 | " | 2.27 | 41.6 | 2.0 | 2.3 | 3.6 | 549 | 32 |
| 7 | " | 95 | 1.2 | semitransparent white | 1.82 | 33.4 | 1.5 | 2.2 | 3.0 | 530 | 34 |
| 8 | " | 100 | 1.0 | semitransparent white | 2.21 | 43.2 | 3.0 | 0.8 | 2.0 | >580 | 38 |
| 9 | " | 98 | 1.1 | semitransparent yellow | 1.90 | 31.0 | 1.6 | 1.8 | 3.4 | 520 | — |
| 10 | " | 96 | 1.4 | semitransparent white | 1.80 | 30.8 | 2.2 | 1.4 | 2.6 | 560 | 35 |
| 11 | " | 99 | 1.3 | semitransparent white | 2.02 | 44.0 | 2.3 | 1.2 | 2.5 | >580 | 39 |
| 12 | " | 100 | 1.5 | semitransparent white | 1.54 | 31.4 | 1.5 | 2.8 | 4.5 | 509 | — |
| 13 | " | 97 | 1.4 | clear yellow | 2.24 | 40.8 | 3.4 | 3.4 | 6.9 | 454 | 36 |
| 14 | " | 98 | 1.3 | " | 2.10 | 36.0 | 2.3 | 0.4 | 1.4 | >580 | 38 |
| 15 | " | 96 | 1.4 | semitransparent white | 1.74 | 31.0 | 1.8 | 3.1 | 5.8 | 481 | 33 |
| 16 | 5/5 | 98 | 2.7 | clear yellow | 1.20 | 40.0 | 3.4 | 0.8 | 3.1 | 530 | 30 |
| 17 | 2/8 | 98 | 1.3 | " | 1.78 | 78.0 | 10.7 | 0.7 | 2.9 | 541 | 28 |

Note: *Weight ratio of condensation curing system/addition curing system in the curable composition.

It is seen from the results in Table 3 that the curable composition of the present invention provides a cured product excellent in heat resistance and mechanical characteristics.

COMPARATIVE EXAMPLE 1

For the sake of comparison with the silicon compounds as components (B) and (C) having a number average molecular weight of not more than 1000 as used in the present invention, a reactive silicone polymer was synthesized.

$8.3 \times 10^{-7}$ mmol/μl solution; $1 \times 10^{-5}$ mmol per SiH group), 34.27 mg of 1,3,5-tris(dimethyl)benzene as a cure retarder (SiH/Si-vinyl: 1/1), 500 g of GR-950, 4.9 g of phosphoric acid, and 1 ml of THF were weighed out and mixed together to form a uniform solution. The solution was cast in an ointment can (inner diameter: 44 mm) which had Teflon sheet on the inner wall thereof and cured by heating at 120° C. for 2.5 hours, at 140° C. for 1 hour, and then at 180° C. for 5 hours.

The resulting cured product was found heterogeneous, consisting of a soft portion and a glassy portion. The soft portion had a thermogravimetric loss as large as 28.5% at 500° C., and that of the glassy portion was 19.0%, still higher than that of the cured product obtained in Examples. Further, observation under a phase-contrast microscope revealed large domains of 50 μm or more.

Comparative Example 2

1,1,3,3,5,5-Hexamethyltrisiloxane (7.5 mmol), 7.5 mmol of divinylmethylphenylsilane, 1.25 mmol of 1,3,5,7-tetramethylcyclotetrasiloxane, and 3.2 g of Ethyl Silicate 40 (produced by Colcoat Company Ltd.) were mixed, and 50 mmol of water, $2\times10^{-3}$ mmol of a platinum-vinylsiloxane complex, 1 mmol of di(2-ethylhexyl) phosphite, and 5 ml of isopropyl alcohol were added thereto, followed by stirring well to prepare a uniform clear solution.

The resulting solution was cast in the same ointment can as used in Example 1 and cured under the same heating condition as in Example 1. The resulting cured product suffered cracks all over the surface and was non-uniform due to undercure in the inside thereof. The physical properties of the cured product were unmeasurable.

As described above, the present invention provides a curable composition which provides on curing a cured product having a silicon type IPN composed of a network silicon skeleton and a silicon-containing polymer, such as polycarbosilane or polysiloxane, in which compatibility between a condensation curing system and an addition curing system before curing and homogeneity after curing can be secured. The cured product obtained from the curable composition exhibits excellent heat resistance and mechanical characteristics and are therefore useful in aerospace industries; transportation means such as automobiles, railroads, vessels, etc., which are expected to increase the speed in the future; and large-sized structures, such as high rises, deep subterranean structures, and submarine structures.

While the invention has been described in detail and with reference to specific embodiments thereof, it will be apparent to one skilled in the art that various changes and modifications can be made therein without departing from the spirit and scope thereof.

What is claimed is:

1. A curable composition comprising:

(A) a silsesquioxane ladder polymer represented by formula (I):

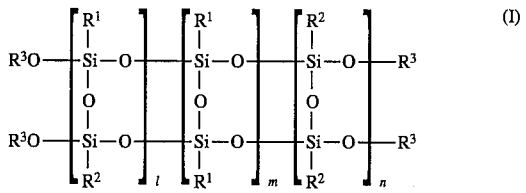

wherein a plurality of $R^1$, which may be the same or different, each represent a monovalent hydrocarbon group; a plurality of $R^2$, which may be the same or different, each represent a monovalent aromatic hydrocarbon group; $R^3$ represents a hydrogen atom or a monovalent hydrocarbon group; l, m, and n each represent 0 or a positive integer satisfying $2 \leq l+m+n$, and having a number average molecular weight of not less than 500, (B) a silicon compound having at least two SiH groups per molecule and having a number average molecular weight of not more than 1,000, (C) a silicon compound having at least two vinylsilyl groups per molecule and having a number average molecule weight of not more than 1,000, and (D) a neutral platinum catalyst.

2. A curable composition according to claim 1, wherein the composition further comprises (E) a catalyst for silanol condensation.

3. A curable composition according to claim 1, wherein the composition further comprises (F) a polyfunctional crosslinking agent capable of silanol condensation of the terminal functional groups of the silsesquioxane ladder polymer.

4. A curable composition according to claim 1, wherein the composition further comprises (G) water.

5. A curable composition according to claim 1, wherein the composition further comprises (H) a silica crosslinking agent selected from the group consisting of silica hydrate, anhydrous silica and silica having been treated with surface treating agents.

6. A curable composition according to claim 1, wherein the composition further comprises (E) a catalyst for silanol condensation and (F) a polyfunctional crosslinking agent capable of silanol condensation of the terminal functional groups of the silsesquioxane ladder polymer.

7. A curable composition according to claim 1, wherein the composition further comprises (E) a catalyst for silanol condensation and (G) water.

8. A curable composition according to claim 1, wherein the composition further comprises (E) a catalyst for silanol condensation and (H) a silica crosslinking agent selected from the group consisting of silica hydrate, anhydrous silica and silica having been treated with surface treating gents.

9. A curable composition according to claim 1, wherein the composition further comprises (F) a polyfunctional crosslinking agent capable of silanol condensation of the terminal functional groups of the silsesquioxane ladder polymer and (H) a silica crosslinking agent selected from the group consisting of silica hydrate, anhydrous silica and silica having been treated with surface treating agents.

10. A curable composition according to claim 1, wherein the composition further comprises (G) water and (H) a silica crosslinking agent selected from the group consisting of silica hydrate, anhydrous silica and silica having been treated with surface treating agents.

11. A curable composition according to claim 1, wherein the composition further comprises (F) a polyfunctional crosslinking agent capable of silanol condensation of the terminal functional groups of the silsesquioxane ladder polymer and (G) water.

12. A curable composition according to claim 1, wherein the composition further comprises (E) a catalyst for silanol condensation and (F) a polyfunctional crosslinking agent capable of silanol condensation of the terminal functional groups of the silsesquioxane ladder polymer and (G) water.

13. A curable composition according to claim 1, wherein the composition further comprises (E) a catalyst for silanol condensation and (F) a polyfunctional crosslinking agent capable of silanol condensation of the terminal functional groups of the silsesquioxane ladder polymer and (H) a silica crosslinking agent selected from the group consisting of silica hydrate, anhydrous silica and silica having been treated with surface treating agents.

14. A curable composition according to claim 1, wherein the composition further comprises (E) a catalyst for silanol condensation, (G) water and (H) a silica crosslinking agent selected from the group consisting of silica hydrate, anhydrous silica and silica having been treated with surface treating agents.

15. A curable composition according to claim 1, wherein the composition further comprises (F) a polyfunctional crosslinking agent capable of silanol condensation of the terminal functional group of the silsesquioxane ladder polymer, (G) water and (H) a silica crosslinking agent selected from the group consisting of silica hydrate, anhydrous silica and silica having been treated with surface treating agents.

16. A curable composition according to claim 1, wherein the composition further comprises (E) a catalyst for silanol condensation, (F) a polyfunctional crosslinking agent capable of silanol condensation of the terminal functional groups of the silsesquioxane ladder polymer, (G) water and (H) a silica crosslinking agent selected from the group consisting of silica hydrate, anhydrous silica and silica having been treated with surface treating agents.

17. A process for producing a molded article, which comprises the steps of: uniformly dissolving or dispersing a curable composition comprising:

(A) a silsesquioxane ladder polymer represented by formula (I):

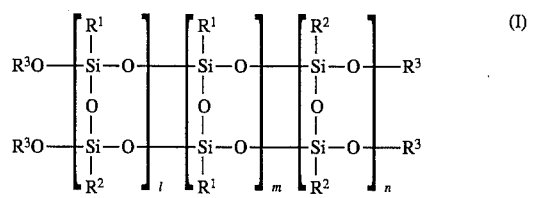

wherein a plurality of $R^1$, which may be the same or difference, each represent a monovalent hydrocarbon group; a plurality of $R^2$, which may be the same or difference, each represent a monovalent aromatic hydrocarbon group; $R^3$ represents a hydrogen atom or a monovalent hydrocarbon group; l, m and n each represent 0 or a positive integer satisfying $2 \geq l+m+n$, and having a number average molecular weight of not less than 500, (B) a silicon compound having at least two SiH groups per molecule and having a number average molecular weight of not more than 1,000, (C) a silicon compound having at least two vinylsilyl groups per molecule and having a number average molecular weight of not more than 1,000, and (D) a neutral platinum catalyst, in 20 to 200 parts by volume of an organic solvent per 100 parts by weight of said silsesquioxane ladder polymer, and maintaining said composition at a temperature lower than the boiling point of said organic solvent for 8 hours or more, casting the composition into a mold and then intermittently or continuously increasing the temperature within a range from 20° to 400° C. thereby to cause hydrolysis and condensation of the alkoxysilyl group and/or silanol group and hydrosilylation to proceed synchronously so as to cure the composition.

* * * * *